(12) United States Patent
Place et al.

(10) Patent No.: US 7,000,510 B1
(45) Date of Patent: Feb. 21, 2006

(54) ADJUSTABLE LOCATOR FOR CLAMSHELL LATHE

(75) Inventors: Brent Place, Hager City, WI (US);
Donato L. Ricci, W8477-162$^{nd}$ Ave., Hager City, WI (US) 54014

(73) Assignee: Donato L. Ricci, Hager City, WI (US)

( * ) Notice: Subject to any disclaimer, the term of this patent is extended or adjusted under 35 U.S.C. 154(b) by 0 days.

(21) Appl. No.: 10/959,657

(22) Filed: Oct. 6, 2004

(51) Int. Cl.
*B23B 19/00* (2006.01)

(52) U.S. Cl. ............................................ 82/113; 82/46
(58) Field of Classification Search ................ 82/113, 82/46, 56, 151; 409/138, 140; 29/41; 7/157
See application file for complete search history.

(56) References Cited

U.S. PATENT DOCUMENTS

| | | | | |
|---|---|---|---|---|
| 4,483,223 A | * | 11/1984 | Nall et al. ..................... | 82/113 |
| 4,739,685 A | | 4/1988 | Ricci ............................... | 82/4 |
| 4,939,964 A | | 7/1990 | Ricci ........................... | 82/113 |
| 5,054,342 A | * | 10/1991 | Swiatowy et al. ............ | 82/113 |
| 5,549,024 A | | 8/1996 | Ricci ........................... | 82/113 |
| 5,599,024 A | * | 2/1997 | Acuff et al. ................ | 473/478 |
| 5,603,250 A | * | 2/1997 | Robinson ....................... | 82/56 |
| 6,619,164 B1 | | 9/2003 | Ricci et al. .................. | 82/113 |
| 6,799,494 B1 | * | 10/2004 | Ricci et al. .................. | 82/113 |

* cited by examiner

*Primary Examiner*—Willmon Fridie, Jr.
(74) *Attorney, Agent, or Firm*—Nikolai & Mersereau, P.A.

(57) ABSTRACT

Disclosed is an adjustable locator for a machining lathe for machining a pipe or similar work piece. The locator includes a locator pad having a main body and a shoulder which is inserted into a socket in the stationary member of the machining lathe. The locator pad also includes an extension plate which can be both axially displaced or adjusted relative to the main body and shoulder to thereby position the clamshell lathe relative to the workpiece.

11 Claims, 2 Drawing Sheets

ADJUSTABLE LOCATOR FOR CLAMSHELL LATHE

BACKGROUND OF THE INVENTION

I. Field of the Invention

This invention relates generally to a split frame clamshell machining lathe for cutting and finishing relatively large diameter pipes, and more particularly to adjustable locators for aligning the large diameter pipes in the clamshell lathe.

II. Discussion of the Prior Art

Split frame clamshell lathes of the type described herein are known in the art. U.S. Pat. Nos. 4,739,685; 4,939,964; 5,549,024; and 6,619,164 are illustrative of the technology involved. The teachings of these patents are hereby incorporated by reference. As described therein, a clamshell machining lathe generally comprises a first and a second semi-circular segment that are designed to be joined together to form an annular assembly for encircling a shaft or pipe to be machined. The assembly also generally includes a stationary ring, and a rotatable ring supported by bearings affixed to the stationary ring. The rotatable ring includes a spur gear on its outer peripheral surface and is journaled to the stationary ring for rotation about a concentrically disposed pipe or work piece. A motor is attached to the stationary assembly and includes a drive gear designed to mesh with the spur gear on the rotatable segment of the pipe lathe. A tool block for supporting a cutting tool is mounted to the rotatable segment and is designed such that a cutting tool is advanced in small incremental steps in a radial direction against the pipe to be machined upon each orbit of the ring gear about the work piece.

A problem has heretofore existed in the prior art when the diameter of the work piece does not exactly correspond with the diameter of the clamshell housing. If there are no locators mounted to the inner circumference of the stationary member of the clamshell lathe, then the cutting may be uneven. To solve this problem, standard locators were inserted into pockets machined into the housing of the stationary member. The standard locators were then axially adjusted manually to accommodate different sized work pieces and to precisely center the clamshell lathe on the work piece. This type of adjustment was somewhat uncontrolled and tended to be inaccurate. Placing the prior art locators in an ideal position both axially and radially is a time-consuming endeavor.

While the prior art locators prove marginally acceptable for clamshell lathes to be used with piping or shafts up to five feet in diameter, when a clamshell lathe is built to machine work pieces whose diameters may be ten feet or greater, it becomes increasingly difficult to set up the machine because of the overall weight thereof. While the standard, prior art locators can be used to effect radial positioning so that the clamshell lathe annulus is concentric with the work piece to be machined, axial positioning becomes increasingly difficult. In the past, a brute force approach has been used where workmen axially position the clamshell lathe on the work piece using a sledgehammer to beat the clamshell to a desired axial position.

It is the purpose of the present invention to simplify the alignment of the locators and therefore the clamshell lathe by providing an adjustable locator which can be adjusted in both the axial and the radial direction. It is a further object of this invention to reduce the setup time required for mounting a clamshell lathe in a pipe or shaft to be machined and to reduce the amount of physical work involved.

SUMMARY OF THE INVENTION

The present invention comprises a device to be used in combination with a clamshell lathe for centering and aligning the clamshell lathe with a work piece to be machined. The device itself comprises a body member that is adapted to be positioned in a pocket formed in the stationary member of a clamshell lathe where the body member at least partially extends outward from an inner diameter of the stationary member. A set screw is rotatably coupled to the body member and has external threads thereon for cooperating with a threaded bore in the stationary member leading to the pocket whereby rotation of the set screw displaces the body member relative to the pocket in a radial direction. Slidingly secured to a base of the body member is an extension plate. The extension plate has a threaded nut affixed to it and a rotatable adjustment screw mounted for rotation in the body member cooperates with the threaded nut for axially translating the body member (therefore the clamshell lathe) relative to the extension plate.

A plurality of these adjustable locators are interleaved with conventional standard locators around the inner diameter of the clamshell lathe annular stationary member and by proper manipulation of the radial adjustment provided by the standard locators and the axial adjustment provided by the adjustable locators of the present invention, the clamshell lathe can be "walked" in the axial direction along the pipe using wrenches to turn the adjustment screws, thereby obviating the need to beat on the clamshell lathe annulus with a sledgehammer.

For a better understanding of this invention, and the advantages obtained in its use, reference should be made to the drawings and the accompanying descriptive material, in which there is illustrated and described a preferred embodiment of the invention.

DESCRIPTION OF THE DRAWINGS

The foregoing features, objects and advantages of the invention will become apparent to those skilled in the art from the following detailed description of the preferred embodiment, especially when considered in conjunction with the accompanying drawings in which like numerals in several views refer to the corresponding parts.

DESCRIPTION OF THE PREFERRED EMBODIMENT

Figure 1:
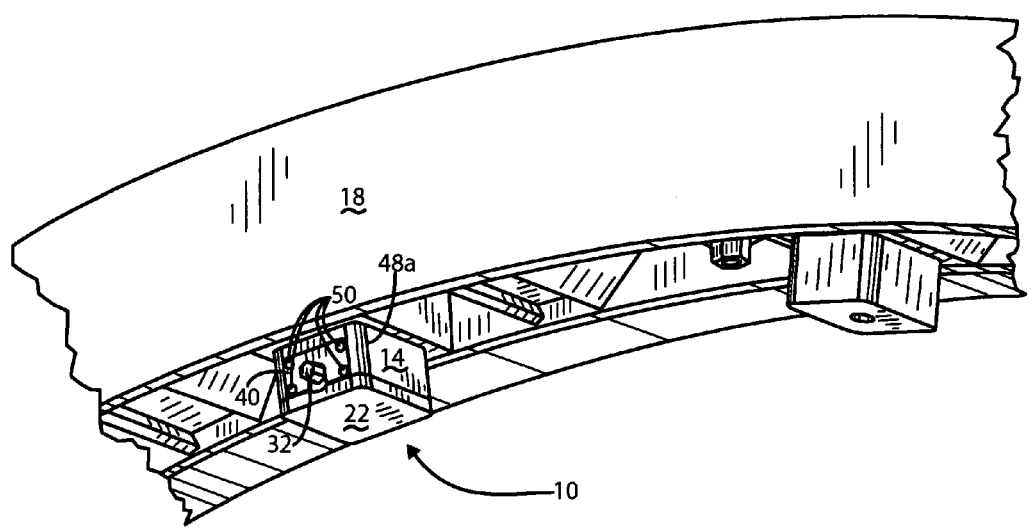
FIG. 1 illustrates a partial perspective view of a segment of the clamshell lathe with both an adjustable locator of the present invention and a standard locator affixed thereto.
Figure 2:
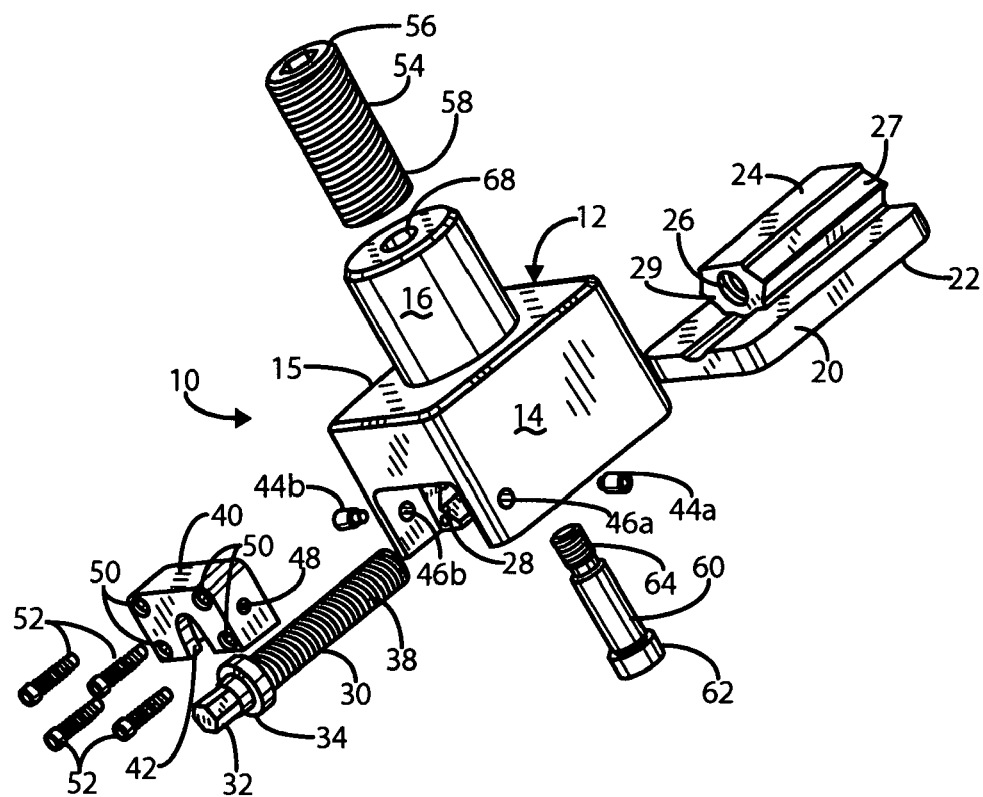
FIG. 2 shows an exploded perspective view of the adjustable locator of the present invention.

Referring to the perspective view of FIG. 1 and the exploded view of FIG. 2, the adjustable locator 10 includes a body member 12 having a rectangular block member 14 and a cylindrical pedestal 16. The body member 12 has a top surface 15, four mutually perpendicular sides 17, and an open bottom. The cylindrical pedestal 16 projects from the top surface 15. V-shaped gibs 28 are located on an inner surface of opposed sides of the body member.

The body member 12 is adapted to be positioned in a pocket formed in the stationary member 18 of the clamshell housing. The body member 12 at least partially extends outward from an inner diameter of the stationary member.

An extension plate 20 is slidingly coupled to the body member 14 of the locator pad 12 is extension 20. Extension plate 20 has a bottom surface 22 and a top surface with a nut 24 welded to it.

The adjustable locator 10 has a means for axial adjustment. This means for axial adjustment includes the nut 24 which has a threaded bore 26 extending longitudinally through the it. The nut 24 includes a V-shaped projections 27 on opposed side surfaces thereof. The V-shaped projections 27 extend parallel to the threaded bore 26, and are adapted to fit in the V-shaped gibs 28 in the body member 14. A rotatable adjustment screw 30 is also provided. The rotatable adjustment screw 30 has a first end 32, a flange element 34 and a threaded portion 38. The threaded portion 38 is coupled to threaded bore 26 of nut 24 and rotation of the rotatable adjustment screw 30 axially translates the body member 14 relative to the extension plate 20.

A bracket 40 captures the annular flange portion 34 of rotatable adjustment screw 30. The head 32 of the rotatable adjustment screw 30 extends through inverted u-shaped cavity 42. The bracket 40 is secured in the body member 14 by inserting it into a cavity in the side wall and is secured by set screw 44a and 44b which pass through apertures 46 in the body member 14 and into threaded aperture 44 in the bracket 40. Further, socket head set screws 52 pass through front apertures 50 in the bracket 40 into threaded bores in the ends of the V-shaped gibs 28.

The adjustable locator 10 also has a means for radially adjusting the body member 12 relative to a workpiece on which the too is being used. This includes a set screw 54 having a first end 56 and a second end 58, the second end being rotatably coupled to the body member 12 at the cylindrical pedestal 16. The set screw 54 has external threads which cooperate with a threaded bore in the stationary member 18 leading to the pocket whereby rotation of the set screw 54 displaces the body member 12 radially within the pocket. The cylindrical pedestal 16 includes a longitudinal bore 68 for receiving a shoulder bolt 60 having a first end 62 and a second end 64. The second end 58 of the set screw 54 has a concentric threaded bore and is adapted to receive the second end 64 of shoulder bolt 60. The second end 64 passes through bore 68 in the pedestal 16 to be received by the second end 58 of the set screw 54. As previously described, because cylindrical pedestal 16 is inserted into a pocket in the stationary member 18 set screw 54 is also disposed in an internally threaded socket. Thus, when the body member 12 needs to be radially adjusted an Allen wrench is inserted into first end 56 of the set screw 54 which is now disposed in the socket and rotated. This rotation displaces the body member 12 radially relative to the pocket.

Thus, now the locator can be easily adjusted either radially or axially to properly align the lathes cutting tool with the surface of a work piece to be machined. To axially adjust the locator the first hex end 32 of rotatable adjustment screw 30 is rotated by a suitable wrench to move the stationary member 18 axially relative to the work piece on which the extension plate 22 rests. As previously described, in order to radially adjust the body member 12, an Allen wrench is applied to the first end 56 of the set screw 54 which rotates locator set screw 54, displacing to the adjustable locator 10 relative to the clamshell lathe on which it is mounted.

In use, a plurality of the adjustable locators described herein are interleaved with standard, non-axially displacable locators around the inside diameter of the clamshell lathe assembly. If on initial installation, the plane of the clamshell lathe is not perfectly perpendicular to the center line of the work piece, various ones of the axially adjustable locator members can be actuated by applying a suitable wrench to the hex end 32 of the adjustment screw 30 and turning the screw in a direction to translate a predetermined arc of the clamshell lathe so that it is no longer inclined relative to the center axis of the work piece.

Further, by appropriately manipulating the radial adjustment screws on the several locators, the extension plates 20 of the adjustable locators 10 can be lifted from the surface of the workpiece, allowing the extension plates to be cranked back to a start position before again being lowered onto the workpiece through radial adjustment of the standard locators. In this fashion, the clamshell lathe can be displaced further in the axial direction. Repeating the foregoing steps results in the ability to "walk" the clamshell lathe through several inches in the axial direction if necessary to obtain a desired purchase between the cutting tool of the clamshell lathe and the surface of the workpiece to be machined.

Even though numerous characteristics and advantages of the invention have been set forth in the foregoing description, together with the details of the structure and the function of the invention, the disclosure is illustrative only, and changes can be made in detail, especially in areas of shape, size and arrangements of parts, within the principles of the invention, to the full extent indicated by the broad, general meaning of the appended claims.

What is claimed is:

1. In combination with a clamshell lathe, a device for centering and aligning the clamshell lathe with a workpiece to be machined, said device comprising:
   a) a body member adapted to be positioned in a pocket formed in a stationary member of a clamshell lathe and at least partially extending outward from an inner diameter of the stationary member;
   b) a set screw rotatably coupled to the body member and having external threads for cooperating with a threaded bore in the stationary member leading to the pocket whereby rotation of the set screw displaces the body member relative to said pocket;
   c) an extension plate slidingly coupled to the base portion of the body member, the extension plate having a threaded nut affixed thereto; and
   d) a rotatable adjustment screw operatively coupled between the body member and the threaded nut for axially translating the body member relative to the extension plate.

2. The device as in claim 1 wherein the body member comprises a hollow rectangular block member having a top surface, four mutually perpendicular sides and an open bottom with a cylindrical pedestal projecting from said top surface and a V-shaped gibs located on an inner surface of opposed sides of the body member.

3. The device as in claim 2 wherein the threaded nut includes V-shaped projections on opposed side surfaces thereof extending parallel to the nut's threaded bore, said V-shaped projections fitting into the V-shaped gibs.

4. The device as in claim 2 wherein the cylindrical pedestal includes a longitudinal bore for receiving a bolt therethrough, the bolt rotatably securing the set screw to the body member.

5. The device in claim 1 and further including a bracket attached to the body member for capturing the rotatable adjustment screw to the body member.

6. A clamshell lathe comprising:
   a) at least two arcuate segments that connect together to form an annular assembly for encircling a work piece;

b) the annular assembly including a stationary ring and a rotatable ring supported by bearings affixed to the stationary ring, wherein the rotatable ring includes a spur gear on an outer peripheral surface of the rotatable ring and is journaled for rotation to the stationary ring for rotation about the work piece;

c) a motor disposed on the stationary assembly and including a drive gear designed to mesh with the spur gear;

d) a tool block supporting a cutting tool mounted to the rotatable ring wherein the cutting tool is advanced in a radial direction against the work piece upon each orbit of the rotatable ring about the work piece; and e) a plurality of adjustable locators and fixed locators for centering and aligning the clamshell lathe with the work piece wherein the adjustable locators and fixed locators are positioned in pockets formed in an inner diameter of the stationary ring.

7. The clamshell lathe as in claim 6 wherein the adjustable locator comprises:

a) a body member adapted to be positioned in the pocket formed in the stationary member of the clamshell lathe and at least partially extending outward from the inner diameter of the stationary member;

b) a set screw rotatably coupled to the body member and having external threads for cooperating with a threaded bore in the stationary member leading to the pocket whereby rotation of the set screw displaces the body member relative to the pocket;

c) an extension plate slidingly coupled to the base portion of the body member, the extension plate having a threaded nut affixed thereto; and d) the rotatable adjustment screw operatively coupled between the body member and the threaded nut for axially translating the body member relative to the extension plate.

8. The clamshell lathe in claim 7 wherein the body member comprises a hollow rectangular block member having a top surface, four mutually perpendicular sides and an open bottom with a cylindrical pedestal projecting from said top surface and V-shaped gibs located on an inner surface of opposed sides of the body member.

9. The clamshell lathe as in claim 8 wherein the threaded nut includes V-shaped projections on opposed surfaces thereof extending parallel to the nuts threaded bore, said V-shaped projection fitting into the V-shaped gibs.

10. The clamshell lathe as in claim 8 wherein the cylindrical pedestal includes a longitudinal bore for receiving a bolt there through, the bolt rotatably securing the set screw to the body member.

11. The clamshell lathe in claim 7 and further including a bracket attached to the body member for capturing the rotatable adjustment screw to the body member.

\* \* \* \* \*